April 20, 1948.　　　　　E. C. SULLIVAN　　　　　2,440,128
PRESSURE COOKER
Filed Oct. 31, 1945
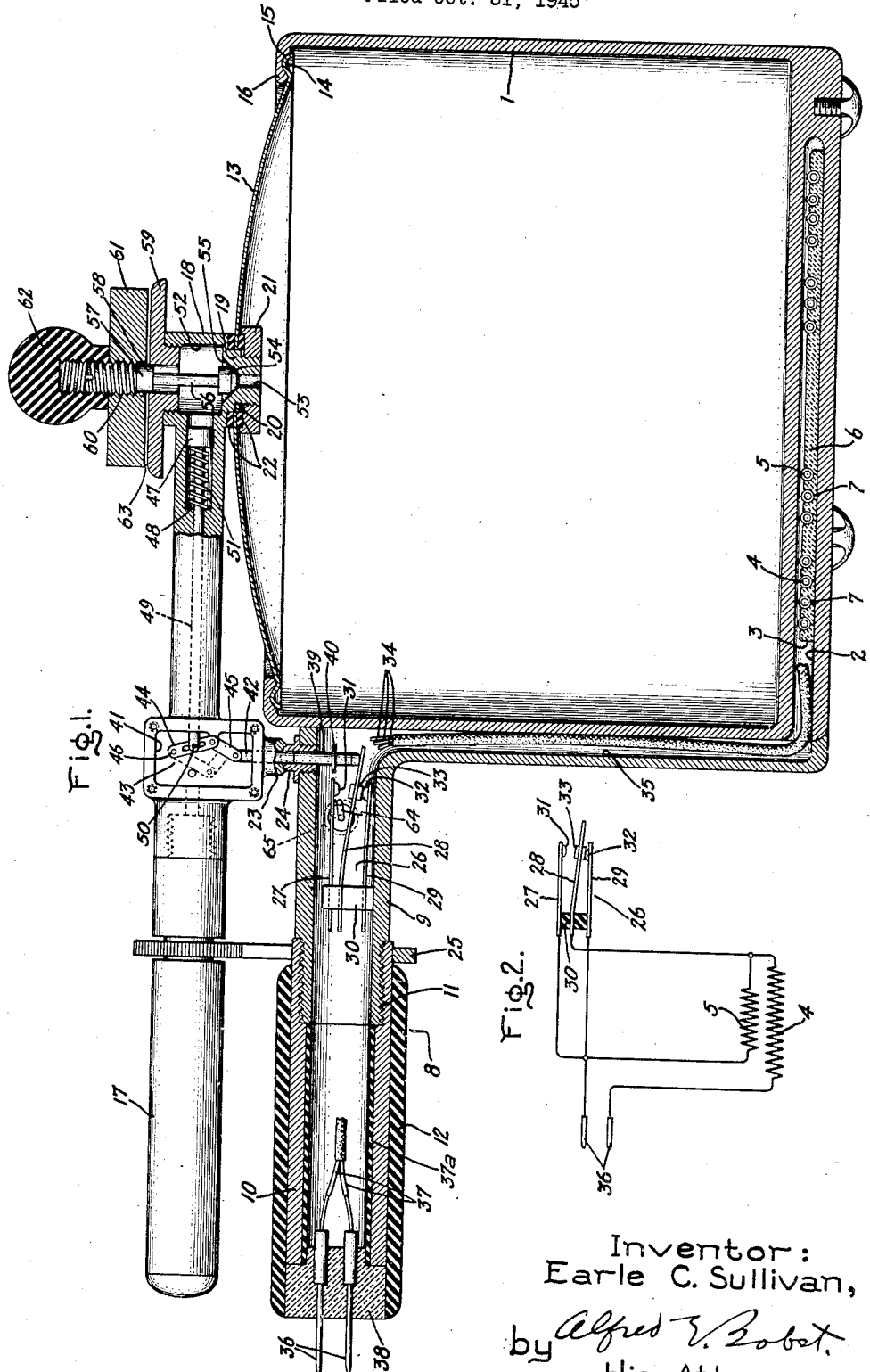
Inventor:
Earle C. Sullivan,
by Alfred E. Bobet
His Attorney.

Patented Apr. 20, 1948

2,440,128

UNITED STATES PATENT OFFICE 2,440,128

PRESSURE COOKER

Earle C. Sullivan, Bridgeport, Conn., assignor to General Electric Company, a corporation of New York Application October 31, 1945, Serial No. 625,899

6 Claims. (Cl. 219—44)

This invention relates to pressure cookers, more particularly to electrically-heated pressure cookers, and it has for its object the provision of improved means for automatically regulating the generation of heat applied to the cooker.

More specifically, this invention contemplates the provision of improved heat control means in a pressure cooker which will give a high heat in order quickly to heat the cooker container and its contents to the desired cooking temperature, and when this temperature has been reached to cut the heat down automatically to a low heat which is sufficient to maintain the cooking temperature. In addition, it contemplates a control means which will provide a cooking heat when the cooker is used as an "open cooker" with the cover either removed or at least out of pressure-sealing relation with the container.

In accordance with this invention, a closed container is provided, together with heating means therefor constructed and arranged to generate either a high heat or a low heat. Switching means is provided for controlling the energization of the heating means, the switching means being operated responsively to the pressure in the closed container for effecting a transfer of the heating means from its high heat to its low heat condition when this pressure attains a predetermined maximum, which maximum corresponds to the high cooking temperature desired.

In one specific embodiment of this invention, the switching means is conditioned to effect a high heat condition in the heating means responsively to the attaching of the cover into its sealing relation with the container, and is operated to its low heat condition in response to the increase in pressure to the desired maximum value.

For a more complete understanding of this invention, reference should be had to the accompanying drawing in which Fig. 1 is a side elevation, mainly in section, of an electrically-heated pressure cooker embodying this invention; and Fig. 2 is a diagrammatic representation of the heating means for the cooker and its controlling switch.

Referring to the drawing, this invention has been shown in one form as applied to a pressure cooker comprising a container 1 which is in the form of a relatively deep, cylindrical saucepan. This container is made of a suitable cast metal, such as aluminum. Within the bottom wall of the container is a chamber 2 for receiving heating means 3. The heating means 3 comprises a high heat-generating element 4 and a low heat-generating element 5 which are mounted upon a suitable electrically-insulating support 6. The heaters may be of any suitable type but have been shown to be of the coiled resistance type. Preferably, they will be inserted in suitable helical recesses 7 provided for them in the plate 6. I call the element 5 the "low" heating element because it is used in series with the element 4 to cut down the total heat generated.

Adjacent the top of the container 1 is a laterally-extending handle 8 which is of hollow tubular form, as shown. The handle comprises a tubular metallic section 9 which is secured to the outer side wall of the container 1 in any suitable way, and a second metallic section 10 secured to the outer end of the section 9, preferably by a screw thread connection 11. Surrounding the section 10 is a handgrip 12.

The top of the container 1 is closed by means of a cover 13. For the purpose of illustration, the cover is constructed and arranged as described in the patent to A. Vischer, Jr., No. 2,282,011, dated May 5, 1942. The cover is provided with a peripheral seating section 14 formed upwardly in the shape of a bead. This section when the cover is in its sealing position bears against a complementary-shaped seat 15 formed on an inwardly-extending flange 16 on the upper end of the container. As pointed out in the Vischer patent, the cover 13 when it is not applied assumes a warped shape, and to apply it the cover is inserted into the container and then forced upwardly into its closed position, as shown in Fig. 1. When it is thus forced upwardly, it is forced into its seating position with a snap action and forms a seal at the top of the container with the seat 15. For the purpose of manipulating the cover, and for forcing it into its sealing position and holding it there, the cover is provided with an elongated handle 17 which, as shown, is attached to the central section of the cooker through a suitable connection fitting 18. The fitting 18 has a depending cylindrical section 19 which extends through a cylindrical aperture 20 provided for it in the center of the cover 13, and it is attached by means of a locking nut 21 which is threaded on the lower end of the section 19, as shown. Sealing washers 22 are provided between the connection fitting 18 and the top of the cover and between the bottom of the cover and the nut 21 in order to prevent leakage and loss of pressure between the fitting and the cover. In order to assist in forcing the cover 13 to its closed position, the handle 17 is provided with a depending socket boss 23 which boss is arranged to coact with a fulcrum boss 24 formed on the handle 8. In order to apply the cover, it is inserted into the container and the handle 17 fulcrumed on the boss 24 to move the cover up to its sealing position shown in Fig. 1. The handle 17 is then locked to the handle 8 to hold the cover in this position by means of a hook 25 rotatable on the handle 17 and engaging under the handle 8, as shown.

The heating elements 4 and 5 are controlled by a switching mechanism 26 mounted in the hollow handle part 9, as shown. This switch 26 comprises three switch arms 27, 28 and 29 stacked one above the other and secured at one end, their left-hand end as viewed in Fig. 1, to an electrically-insulating supporting block 30. The switch arm 27 carries at its other end a contact 31, the switch arm 29 carries a contact 32 facing the contact 31, and the switch arm 28 carries a double contact 33 which operates between the contacts 31 and 32 and is arranged to engage either of them; and this arm 28 is biased upwardly to move its contact 33 to engage contact 31 by the inherent resiliency of the arm. The switch is connected by suitable conductors 34 with the heating elements 4 and 5, which conductors pass through a suitable channel 35 preferably formed integrally with the handle section 9; and with a suitable electrical supply source (not shown) by means of twin supply terminals 36 and conductors 37 extending through the hollow handle section from the switch to the terminals. The twin supply terminals 36 are supported in an electrically-insulating block 38 which also functions to close and seal the outer end of the hollow handle 8. Inserted in the handle section 10 is an electrically insulating sleeve 37a.

The electrical connections between the supply terminals 36, the heaters 4 and 5, and the switch 26 are shown diagrammatically in Fig. 2. As there shown, one terminal 36 is connected to one terminal of the high heating element 4, while the other terminal 36 is connected to a corresponding terminal of the low heating element 5. The other two terminals of the heaters 4 and 5 are connected together and also to the switch arm 28. The terminal of the heater 5 that is connected to supply terminal 36 also is connected to the two switch arms 27 and 29. Because of this arrangement whenever the contact 33 is in engagement with either the contact 31 or the contact 32 the high heat-generating element 4 will be energized, whereas the low heat-generating element 5 will be deenergized. However when the contact 33 occupies a position between the contacts 31 and 32, out of contact with either of them, then the two heaters 4 and 5 will be connected in series to effect a low heat generation.

The switch 26 is controlled so that when the cover 13 is applied in its sealing position with relation to the container 1, the switch will automatically be operated to close contacts 32 and 33 and thereby apply high heat to the container. It is also controlled automatically when the pressure in the container reaches a predetermined maximum to move to a position between the contacts 31 and 32 and thereby provide low heat for the container. It is further controlled so that when the cover is removed the switch will close contacts 31 and 33 to provide high heat for cooking by the "open cooker" non-pressure method.

The control comprises a suitable plunger 39 mounted in the hollow handle section 9 and arranged to coact with an extension on the switch arm 28, as shown. This plunger is mounted in a central aperture provided for it in the fulcrum 24 and is forced upwardly by the switch arm 28. Its upward movement is limited by means of a stop collar 40 rigidly attached to it. Mounted within a chamber 41 formed in the cover handle 17 is a pin or plunger 42 provided to actuate the plunger 39 when the cover 13 is applied in its sealing position. This pin 42 is mounted in a central aperture provided for it in the handle socket member 23 so that when the socket is applied to its fulcrum 24 the pin 42 will engage the plunger 39 and force it downwardly to close switch contacts 32 and 33.

The pin 42 is locked in this switch controlling position by means of a toggle 43 mounted in chamber 41 and having a pair of interconnected toggle links 44 and 45; the link 44 has a fixed fulcrum 46, while the link 45 is pivoted to the upper end of the pin 42. This toggle may be operated through its dead center position to an opposite position (dotted lines in Fig. 1) in which the pin 42 is retracted somewhat so as to permit the plunger 39 to rise and thereby open contacts 32 and 33 but not sufficiently far to close the contacts 31 and 33.

The means for breaking the toggle operates in response to the pressure in the container 1, and it comprises a piston 47 operating in a cylinder 48 provided for it in the handle 17. This piston is connected by means of a piston rod 49 with the toggle link 44 through a pin and slot connection 50. The piston is biased to hold the toggle in its position shown in Fig. 1 by means of a compression spring 51 mounted in the cylinder 48. The outer end of the piston may be exposed to the container pressure through a fluid chamber 52 formed in fitting 18 and into which the cylinder opens and which at its lower end is connected through a port 53 with the container 1; this port is controlled by a gravity-operated valve 54 coacting with a valve seat 55 at the upper end of the port. An operating valve stem 56 is attached to the valve, and also to an enlarged cylindrical section 57 operating in a bore 58 provided for it in a cover member 59 which is provided for the chamber 52. The section 57 is provided with an upper threaded section 60 upon which is threaded a disk-like weight 61 and also a heat insulating knob 62 and the section 57 rather loosely fits the bore 58 so as to provide a clearance space between these elements through which vapor may escape to the atmosphere.

It will be understood that the weight 61 functions to hold the valve 54 against its seat 55 until the pressure in the container builds up to such a value that it will overcome the weight and move the valve upwardly, thereby releasing pressure into the chamber 52. The pressure at which the valve thus operates, of course, will depend upon the magnitude of the weight 61. And the weight will be so chosen that the valve will not release pressure until the desired predetermined cooking temperature is attained. When the valve 54 opens in response to the building up of the pressure it releases the pressure against the exposed face of the piston 47 to operate it toward the left, thereby breaking the toggle and moving it over to its dotted line position of Fig. 1; this permits the pin 42 to withdraw sufficiently far to permit the switch 26 to open the contact 32, but not to close the contact 31. In other words, when the valve 54 releases the pressure, it causes the switch to be operated to connect the two heating elements 4 and 5 in series and thereby apply low heat to the container 1. This heat will be sufficient to maintain the desired cooking pressure.

It is to be understood that the cylinder 57 will clear the upper edge of the bore 58 just after the valve 54 opens so that the pressure in chamber 52 will not be released until it has had the opportunity to operate the piston 47 to the left.

It is also to be understood that once the piston 47 has operated the toggle to the dotted line position, the toggle will be held there by the upward pressure of the switch arm 28, the spring 51 not being sufficiently strong to overcome the pressure of the switch arm. The toggle will be restored to its initial position only when the cover is removed so as to release the pin 42 from the influence of the switch arm.

The valve mechanism in addition to its function of causing operating pressure to be applied to piston 47, acts as a safety valve when it releases steam through the clearance space between the valve section 57 and its bore 59. That is, it acts to hold a substantially constant pressure in the cooking container.

In order to prevent the steam pressure from forcing the valve and weight up too far into the air, the cover 59 is formed with a relatively large plane upper surface. This surface is substantially coextensive with the lower surface of the weight 61 which also is a plane surface. The two surfaces define a relatively narrow space 63 between them. As the steam escapes past the enlargement 57 it moves out into and through the narrow space 63 at a high velocity. This action through the phenomenon known as the Bernoulli effect actually forces the weight downwardly, thereby limiting the escape of steam, and preventing the weight and the valve from being lifted out of position. And it permits the pressure in the chamber 52 to rise to a sufficiently high value to operate the piston 47 in the manner described above. This means for holding the weight down is described and claimed in my copending application, Serial No. 625,900, filed October 31, 1945.

In the operation of the device it will be understood that the edibles with the proper amount of water will be inserted into the container 1 and then the cover 13 will be closed in sealing relation with the cooker in the manner previously described. This operation will operate the switch mechanism 26 to connect the heater 4 only to the supply terminals 36. Then these terminals will be plugged into a suitable supply source which will energize the heater 4 to apply a high rate of heat to the container quickly to bring the container and its contents to the desired cooking temperature, which temperature, as explained, will depend upon the magnitude of the weight 61 selected. When the pressure corresponding to this temeprature has been attained, it will open the release valve 54 and operate the piston 47 in the manner described previously to effect the opening of the contacts 32 and 33 in order to connect the heaters 4 and 5 in series and thereby establish the low heat condition of the heating means. This condition will persist as long as the cover remains in place.

When the cooking process is complete, the terminals 36 will be disconnected from their electrical supply source, and the weight 61 removed by means of the knob 62. By slightly lifting the weight the internal pressure in the container 1 will be quickly reduced to atmosphere. When this has been done the hook 25 will be operated to release the cover 13 and the cover then removed. This operation will permit the switch 26 to close the contacts 31 and 33 so that thereafter, if desired, the cooker can be operated as a non-pressure vessel by reconnecting the terminals 36 with the electrical supply source. Also, of course, the toggle 43 will be reset to its full line position shown in Fig. 1 by the action of the spring 51.

Sometimes it may be desired to supply low heat when the device is being operated as an open cooker. This is accomplished by forcibly moving the switch arm to its intermediate low heat position; this may be done by an insulating crank 64 located in the handle 9 and controlled by a knob 65 exterior of the handle.

While I have shown and described a particular embodiment of my invention, it will be obvious to those skilled in the art that various changes and modifications may be made without departing from my invention in its broader aspects and I therefore aim in the appended claims to cover all such changes and modifications as fall within the true spirit and scope of my invention.

What I claim as new and desire to secure by Letters Patent of the United States is:

1. A pressure cooker comprising a closed container, electrical heating means for said container for generating relatively high and low heats, switching means controlling said heating means selectively to generate said heats, a relief valve for said container operable to release pressure when it attains a predetermined high value in the container, and pressure means operable responsively to the pressure released for operating said switching means to control said heating means to reduce the heat generated from said high to low heats.

2. A pressure cooker comprising a container, electrical heating means for said container constructed and arranged to generate both high and low heats, a switch for controlling said heating means operable when moved to a first position to cause said heating means to generate high heat and when moved to a second to cause the heating means to generate low heat, a cover for closing said container, means operated responsively to the attaching of said cover to said container for moving said switch to said first position, and pressure responsive means operated responsively to a predetermined high pressure in said container for moving said switch to said second position and for holding it there until said cover is removed.

3. A pressure cooker comprising a container, electrical heating means for said container constructed and arranged to generate both high and low heats, a switch for controlling said heating means operable when moved to a first position to cause said heating means to generate high heat and when moved to a second to cause the heating means to generate low heat, a cover for closing said container, means operated responsively to the attaching of said cover to said container for operating said switch to said first position, a pressure responsive device for operating said switch to said second position, a pressure conduit connecting said container with said device, and a pressure relief valve controlling said conduit to admit pressure into it and thus to said pressure responsive device to operate said switch to said second position when the pressure in said container attains a predetermined maximum thereby to cause said heating means to generate low heat, said valve thereafter functioning to prevent rise in the pressure in said container above said predetermined maximum.

4. A pressure cooker comprising a container provided with a removable cover for closing it, heating means for said container constructed and arranged to generate high and low heats, a movable control member for said heating means operable when in a first position to cause said heating means to generate said high heat and when moved therefrom to a second position to generate said low heat, means biasing said control member to move from said first position to said second position, operating means for said control means mounted on said cover and having an operating member movable relative to said cover and normally in position to engage said control member to hold it in said first position when said cover is attached to said container in closing position, and pressure responsive means operated in response to a predetermined high pressure in said container for operating said operating member to release said control member and thereby permit said biasing means to move it to said second position.

5. A pressure cooker comprising a container provided with a laterally extending handle having a chamber therein, electrical heating means for said container constructed and arranged to generate low and high heats, a control switch for said heating means positioned in said chamber operable when in a first position to cause said heating means to generate high heat and biased away from said first position to a second wherein it causes said heating means to generate low heat, a plunger in said chamber for operating said switch to said first position, a cover for closing said container having an operating handle positioned adjacent and substantially parallel to said handle on said container when said cover is in its closing position with reference to said container, said cover handle also having a chamber therein, a movable plunger in said cover chamber extending therefrom for engagement with said first-named plunger to cause it to operate said switch to said first position when said cover is placed in its closing position on said container, a pressure responsive piston in said cover handle operating when moved in one direction to force said plunger therein to release said first-named plunger and thereby permit said switch to move to said second position, a fluid conduit extending from said piston through said cover to the interior of said container arranged when open to expose said piston to the pressure in said container, and a pressure relief valve normally closing said conduit but opening upon the occurrence of a predetermined maximum pressure in said container to release the pressure to said piston to cause it to operate in said one direction.

6. A pressure cooker comprising a closed container, electrical heating means therefor constructed and arranged to generate high and low heats, a control switch connected to said heating means so that when the switch is in a first position it causes said heating means to generate said high heat and when in a second to generate said low heat, means biasing said switch away from said first position toward said second position, a toggle mechanism for holding said switch in said first position against the force of said biasing means, and means operable responsively to the pressure in said container for breaking said toggle mechanism when said pressure attains a predetermined maximum value so as to release said switch and thereby permit said biasing means to move it to said second position and thereafter to hold it therein irrespective of the pressure condition in said container.

EARLE C. SULLIVAN.

REFERENCES CITED

The following references are of record in the file of this patent:

UNITED STATES PATENTS

| Number | Name | Date |
| --- | --- | --- |
| 1,931,190 | Goughnour | Oct. 17, 1933 |
| 2,308,603 | Graham | Jan. 19, 1943 |
| 2,392,077 | Wilson | Jan. 1, 1946 |